Patented May 10, 1932

1,857,501

UNITED STATES PATENT OFFICE

GEORGE F. GALLAGHER, OF ALBANY, NEW YORK

LUBRICANT

No Drawing.   Application filed September 19, 1928.   Serial No. 307,059.

My invention relates to lubricants or preparations of that general character which are useful in loosening rusted, corroded, or so-called "frozen" connections.

The general object of my invention is to provide a composition of this character having high penetrating powers or characterized by a high degree of capillarity adapting it to quickly work its way into extremely minute spaces and to penetrate and dissolve rust and corrosion. Another object is to provide a lubricant for spring leaves and the like which will not only quickly penetrate or spread to all points between the leaves but which will retain its lubricating properties for a long period after being applied.

My composition includes as essential ingredients, kerosene, a vegetable oil having the properties of olive oil, crude oil or a refined lubricating oil having a specific gravity of about 0.89–0.91, and a liquid substance such as amyl or ethyl acetate, or acetone, adapted to retard the evaporation of the more volatile constituents in the oils. With the above ingredients I prefer to incorporate a small quantity of ethyl ether which appreciably increases the penetrating, and rust and corrosion dissolving properties of the composition, and also a small quantity of comminuted graphite which is carried into minute spaces by the liquid and not only improves the lubricating properties of the composition but also remains where carried long after the less stable constitutents of the composition have disappeared.

There is no substance of which I am aware which will serve as a substitute for the kerosene in my composition. As a vegetable oil, there is nothing of which I am aware which will function quite as well as pure olive oil. Cottonseed oil, a well known adulterant of olive oil, may be used, or a carefully prepared blend of poppy-seed oil and linseed oil, or various nut oils, all having some of the penetrating powers of olive oil, but in a considerably lesser degree, may be used with varying success. In spite of its high cost olive oil, alone, is recommended for the best results.

Crude oil having a heavy body, or a refined heavy lubricating oil having a specific gravity of about 0.89–0.91 (depending on the base) may be used interchangeably without producing appreciable variation in the efficiency of the composition in quickly loosening frozen connections, but for lubricating purposes, the refined oil is to be preferred.

Unless some ingredient such as amyl acetate, ethyl acetate or acetone is used the composition, where applied, will dry out within twenty-four hours, and the principal function of this ingredient is therefore to give longevity. Amyl acetate is to be preferred because of its penetrating powers and because its odor is not unpleasant. On the other hand, acetone, although a powerful solvent, is of such rank odor that some small quantity of aromatic oil or other substance must be used as a neutralizer.

A small quantity of ethyl ether is used to speed up the action of the composition as a "loosener" and adds greatly to the quick penetrating properties.

When used principally as a lubricant, as in vehicle springs, or where large threaded connections are to be loosened, a small quantity of comminuted graphite is of considerable value as a lubricant in itself which will remain where carried by the liquid.

One hundred gallons of my preferred composition comprises the following ingredients in about the proportions noted:

| | |
|---|---|
| Kerosene | 65–70 gallons |
| Lubricating oil having a heavy body | 27–32 gallons |
| Olive oil | 2–2½ gallons |
| Amyl acetate | 1 to 4 quarts |
| Ethyl ether | 1. 5–6 pounds or 2. 0–8 pints |
| Graphite (powdered) | about 2 pounds |

From the foregoing analysis it will be apparent that my composition is of comparatively thin consistency and might perhaps be termed a "lively" liquid as distinguished from a more viscous or "sluggish" composition in which crude oil or lubricating oil is the predominating ingredient.

I am aware, of course, that others have proposed compositions of this general character having kerosene, lubricating oil, amyl acetate, ether and graphite together with other ingredients therein, but in proportions, however, widely different from mine, and which form mixtures having substantially different physical characteristics.

It therefore is to be understood that the words which I have used in describing my invention are words of description and not of limitation, and that changes within the spirit of the appended claims may be made without departing from my invention in its broader aspects.

What I claim is—

1. A lubricant containing, by volume, 27% to 32% of heavy lubricating oil, 0.25% to 1% of amyl acetate, from 2% to 2.5% of a vegetable oil selected from the group, olive oil and cottonseed oil, and the balance principally kerosene.

2. A lubricant containing, by volume, 27% to 32% of heavy lubricating oil, 0.25% to 1% of amyl acetate, from 2% to 2.5% of a vegetable oil selected from the group, olive oil and cottonseed oil, up to 1.0% of ethyl ether, and the balance principally kerosene.

3. A lubricant comprising the following ingredients mixed together in about the following stated proportions: kerosene, 65 to 70 gallons; heavy lubricating oil, 27 to 32 gallons; a vegetable oil selected from the group, olive oil and cottonseed oil, 2 to 2.5 gallons; ethyl ether, 4 to 6 pints; comminuted graphite up to 2 pounds; and amyl acetate, 2 quarts.

4. A lubricant having as essential ingredients, by volume, 27% to 32% of heavy lubricating oil, 2% to 2.5% of olive oil, 0.25% to 1% of amyl acetate, up to 1% of ethyl ether and the balance principally kerosene.

GEORGE F. GALLAGHER.